United States Patent [19]

Ernst et al.

[11] 4,077,504
[45] Mar. 7, 1978

[54] SELF-CENTERING CLUTCH THRUST BEARING

[75] Inventors: Horst Manfred Ernst, Eltingshausen; Armin Olschewski, Schweinfurt; Rainer Schurger, Schwanfeld; Lothar Walter, Schweinfurt; Manfred Brandenstein, Aschfeld; Erich Burkl, Stammheim, all of Germany

[73] Assignee: SKF Industrial Trading & Development Co. B.V., Jutphaas, Netherlands

[21] Appl. No.: 657,977

[22] Filed: Feb. 13, 1976

[30] Foreign Application Priority Data

Feb. 20, 1975 Germany ............................ 2507194

[51] Int. Cl.² ............................................ F16D 23/14
[52] U.S. Cl. ..................................................... 192/98
[58] Field of Search ............................... 192/98, 110 B

[56] References Cited

U.S. PATENT DOCUMENTS

| 3,788,437 | 1/1974 | Camp | 192/98 |
| 3,882,979 | 5/1975 | Limbacher et al. | 192/98 |
| 3,967,710 | 7/1976 | Ernst et al. | 192/98 |
| 3,985,215 | 10/1976 | Ernst et al. | 192/98 |

FOREIGN PATENT DOCUMENTS

| 1,944,839 | 1/1971 | Germany | 192/98 |

Primary Examiner—Benjamin W. Wyche
Attorney, Agent, or Firm—Daniel M. Rosen

[57] ABSTRACT

An improved self-centering clutch thrust bearing is described which includes a rolling bearing assembly and a sleeve bearing. The sleeve bearing and rolling bearing assembly each include radially extending flanges and means are provided for captivating the flanges in an axial direction while allowing limited play in a radial direction. An annular collar and an annular disc are also provided and are positioned for enabling a limited relative motion in a radial direction between the bearing assembly and the sleeve bearing.

20 Claims, 8 Drawing Figures

SELF-CENTERING CLUTCH THRUST BEARING

BACKGROUND OF THE INVENTION

This invention relates to an improved arrangement for the self-centering of a clutch thrust bearing.

In one form of clutch thrust bearing, the thrust bearing comprises a rolling bearing assembly which is positioned adjacent a sleeve bearing. The sleeve bearing is adapted for sliding contact with a shaft or the like. It is desirable that the thrust bearing exhibit a self-centering characteristic. In a known arrangement of this kind, the rolling bearing assembly includes a non-rotating or stationary ring bearing member which abuts a flange of the sleeve member. A spring is provided and acts on this stationary ring member before and after declutching in order to automatically maintain self-centering between the bearing assembly and the sleeve bearing. However, it has been found that the frictional forces existing between a contact surface and the bearing are relatively high and reduce the effectiveness of the spring in causing radial movement of the thrust bearing and self-centering as the clutch is being operated.

Accordingly, it is an object of this invention to provide an improved arrangement for enabling self-centering of a clutch thrust bearing.

Another object of the invention is to provide a clutch thrust bearing arrangement which is readily centered and which maintains its centered position as the clutch is operated.

SUMMARY OF THE INVENTION

In accordance with features of the invention, an improved arrangement for self-centering a clutch thrust bearing is provided and comprises a sleeve bearing having a radially extending flange and a rolling bearing assembly including first and second ring shaped members and a plurality of rolling bearing elements which are positioned between the ring shaped members. One of the ring shaped members includes a radially extending flange which is positioned adjacent the sleeve flange. A means is provided for captivating this radially extending flange adjacent the flange of the sleeve in a manner which restrains axial movement between these flanges while enabling a limited relative movement in a radial direction. An annular shaped means is provided and is adapted for enabling limited relative motion in a radial direction of the rolling bearing assembly with respect to the sleeve bearing.

In a preferred embodiment of the invention, the annular shaped means comprises a collar means and a disc means which are positioned between the sleeve and an inner, non-rotating, ring member of the bearing assembly. The collar and disc means engage and are radially dimensioned for permitting a limited movement between the ring member and sleeve bearing in a radial direction.

In accordance with more particular features of the invention the collar means has a cross sectional configuration which is U or S shaped and cooperates with one or a plurality of discs. The collar is preferably circular shaped and is formed of a plastic polymer. The disc is similarly formed of a plastic polymer or of a metal such as steel.

In one arrangement, the inner rolling bearing member has a generally frustoconical shape and the collar means is positioned adjacent and seated against an inner surface or bore provided by this member.

In an alternative embodiment of the invention, the collar and disc means extend about an outer bearing member of the rolling bearing assembly and one of these means is supported on the outer bearing member while the other means is positioned against and seated at a surface of an adjacent housing.

In accordance with another feature of the invention, the annular collar means is split into semiannular segments thereby facilitating the assembly of the disc and the collar.

DESCRIPTION OF THE DRAWINGS

These and other objects and features of the invention will become apparent with reference to the following specification and to the drawings wherein.

DETAILED DESCRIPTION

Figure 1:
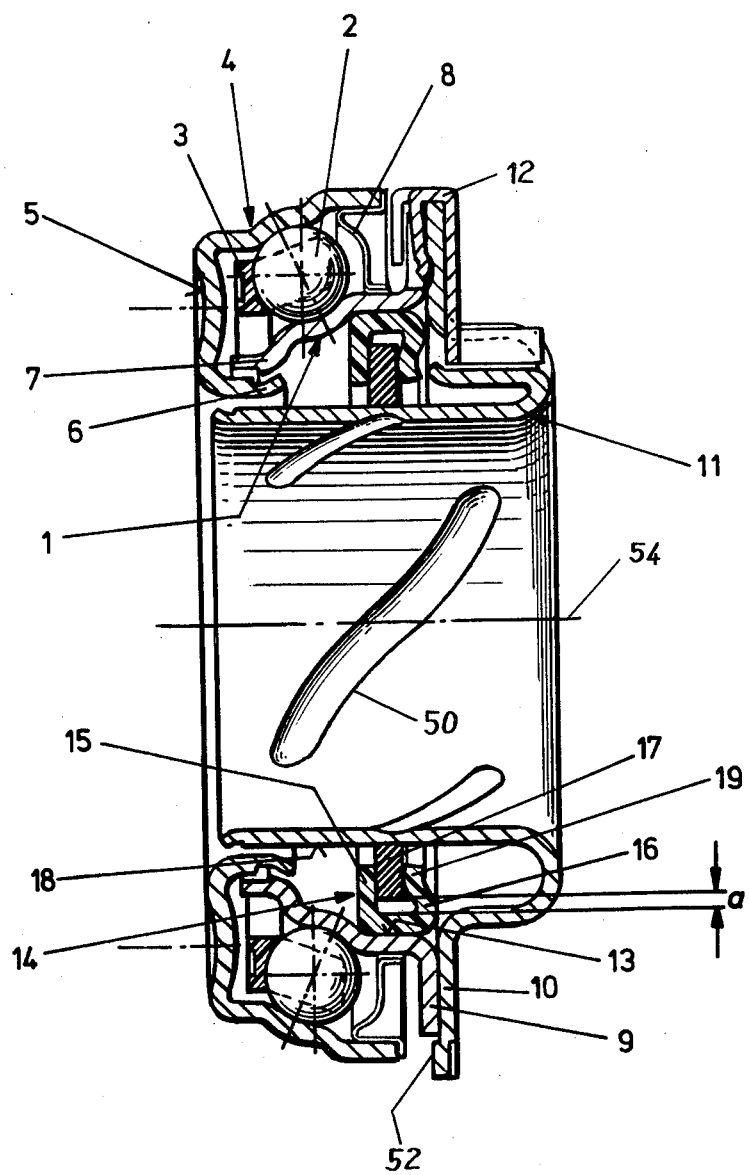
FIG. 1 is a sectional view through a self-centering, clutch thrust bearing arrangement constructed in accordance with one embodiment of the present invention; taken along the line B—B of FIG. 8.

Referring now to FIG. 1, the clutch thrust bearing is shown to comprise a rolling bearing assembly having a rotationally stationary inner ring member 1 which is formed of sheet metal, for example, and which has a generally frustoconical shape. The assembly further includes a plurality of rolling bearing ball members 2, a ball restraining cage 3, and an outer ring member 4. This outer ring member is provided with a concave-shaped ring surface 5 for installation of clutch levers of a clutch, not illustrated. The members of the bearing assembly are held together by a radial edge 6 of the outer ring member 4, which is flanged in a radially outward direction and which extends, with clearance, behind an angular section 7 of the inner ring member 1. The bearing assembly is sealed against foreign matter on a side opposite the clutch by a stamped, sheet-metal ring shaped body 8. A radially extending flange 9 is integrally formed at the inner ring member 1.

A generally cylindrically shaped sleeve bearing 11 is provided and is adapted to provide a bearing surface for a sliding shaft or the like, not shown. A number of oil grooves 50 are formed on the bearing surface. A flange 10 is integrally formed in the sleeve bearing and extends in a radial direction from an outer surface of the bearing 11. The radially extending flange 9 of the inner ring member 1 abuts the flange 10 of the sleeve bearing and its surface is captivated adjacent a surface of the flange 10 by at least one clamp element 12. It will be noted that the outer diameter of the flange 10 is greater than the outer diameter of the flange 9 and that a ridge 52 is formed near the periphery of the flange 10. The clamp 12 has a generally U shaped configuration which is dimensioned to restrict relative motion between the flanges 9 and 10 in an axial direction while enabling a limited relative motion between these flanges in a radial direction. The bearing assembly as illustrated in FIG. 1 is shown to be concentrically positioned with respect to a longitudinal axis 54 of the sleeve 11. The arrangement thus provides sufficient "play" for enabling the flange 9 of the inner ring member 1 to move between its centered position as shown and the ridge 52.

Figure 8:
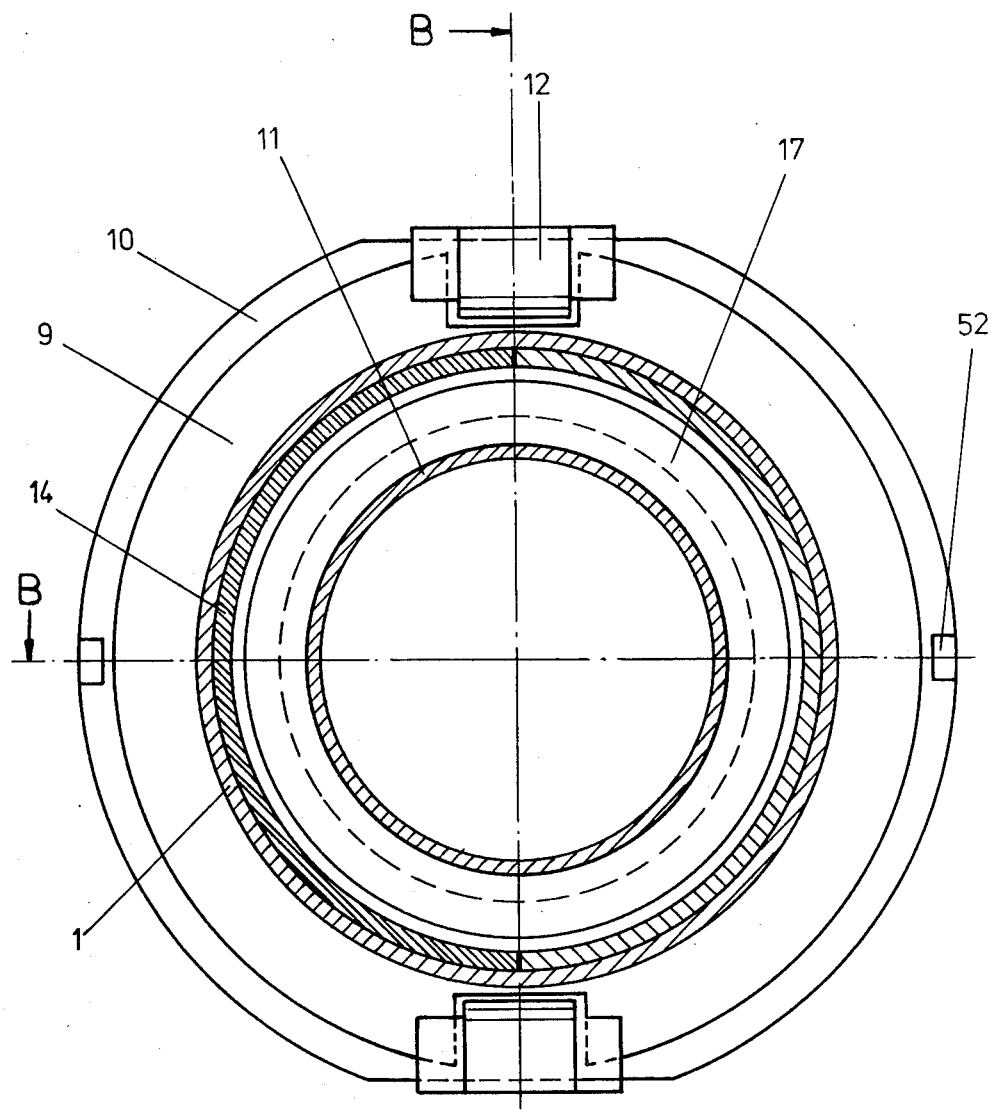
FIG. 8 is a cross sectional view, of a collar and disc arrangement utilized with the thrust bearing arrangement of FIG. 1, taken along the lines A—A thereof.

An annular shaped means which is adapted for enabling limited relative motion in a radial direction between the rolling bearing assembly and the sleeve bearing is provided and is shown to comprise an annular collar means 14 and an annular engaging disc means 17. The collar means 14 is formed, for example, of a plastic such as a polymer and as illustrated in FIG. 1, has a generally U shaped cross section with an inner diameter greater than the outer diameter of the cylindrically shaped sleeve 11, and, an outer diameter which provides for positioning and seating of the collar at a bore 13 of substantially uniform diameter or the frustoconically shaped inner ring member 1. The U shaped collar 14 includes leg segments 15 and 16 which extend radially inward from the outer periphery of the collar. The disc 17 which, as shown, is formed of a metal such as steel may also be formed of a plastic such as a polymer. It is ring shaped and has an inner diameter for providing a snug or press fit about the outer surface or casing 18 of the sleeve 11. The disc has a width enabling it to extend between the collar leg segments 15 and 16 and thereby engage the collar. The collar leg segment 16 is formed to include a tongue 19 which provides a resiliency for this leg and establishes a force which presses the steel disc 17 against the other leg 15 of the collar 14. As illustrated in FIG. 8, the collar 14 is in a composite assembly formed by segments shown to be semicircular. After positioning of the disc 17 on the sleeve 11, the segments of the collar 14 are positioned and are secured together by gluing, by an adhesive or by mechanical means.

Since an outer diameter of the disc 17 is less than the outer diameter of the inner thickness at the periphery of the collar 14, a radial clearance "a" (FIG. 1) is provided between the disc 17 and the collar. This clearance "a" enables a limited relative motion in a radial direction between the inner ring member 1 (and thus the rolling bearing assembly) and the sleeve 11. When the clutch is operated, the clutch thrust bearing can then be automatically displaced in a radial direction and automatically centers itself with respect to the sleeve 11. The clutch thrust bearing assembly is then maintained in the centered position by the collar 14 and the clamped disc 17 which is supported on the sleeve 11.

Figure 2:
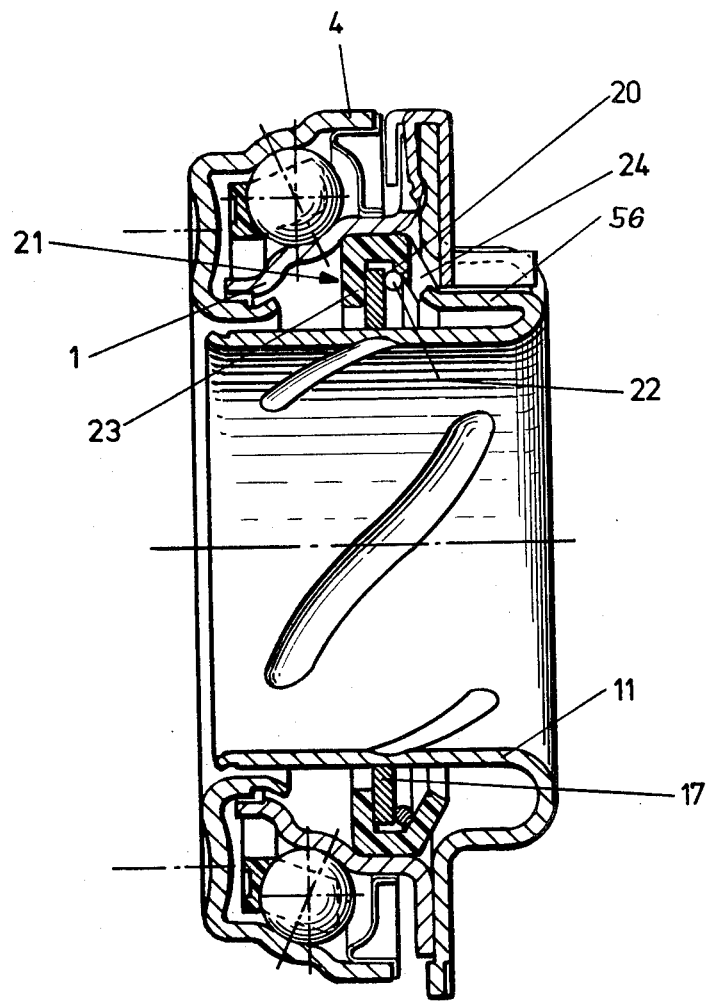
FIGS. 2, 3, 4, 5 and 6 are sectional views of a self-centering clutch thrust bearing arrangement constructed in accordance with the invention and illustrating alternative embodiments of a U shaped collar and disc arrangement.

FIG. 2 illustrates an alternate arrangement of the collar and disc of FIG. 1. Those members of the thrust clutch bearing of FIGS. 2–8 which perform similar functions as those described herein with respect to FIG. 1 will bear the same reference numerals as illustrated in FIG. 1. The collar and disc arrangement of FIG. 2 differs from that of FIG. 1 in that while it exhibits a generally U shaped configuration, a leg 20 of the collar 21 extends obliquely outward and the disc 17 is pressed against the other leg 23 by a split ring 22. The split ring 22 is positioned between the obliquely extending leg 20 and the disc 17 and exerts a tension toward the outside. The leg 20 is provided with one or more recesses 24 into which extend a folded segment 56 of the sleeve 11. These segments grap and inhibit the collar 21 from twisting in a circumferential direction relative to the sleeve 11.

Figure 3:
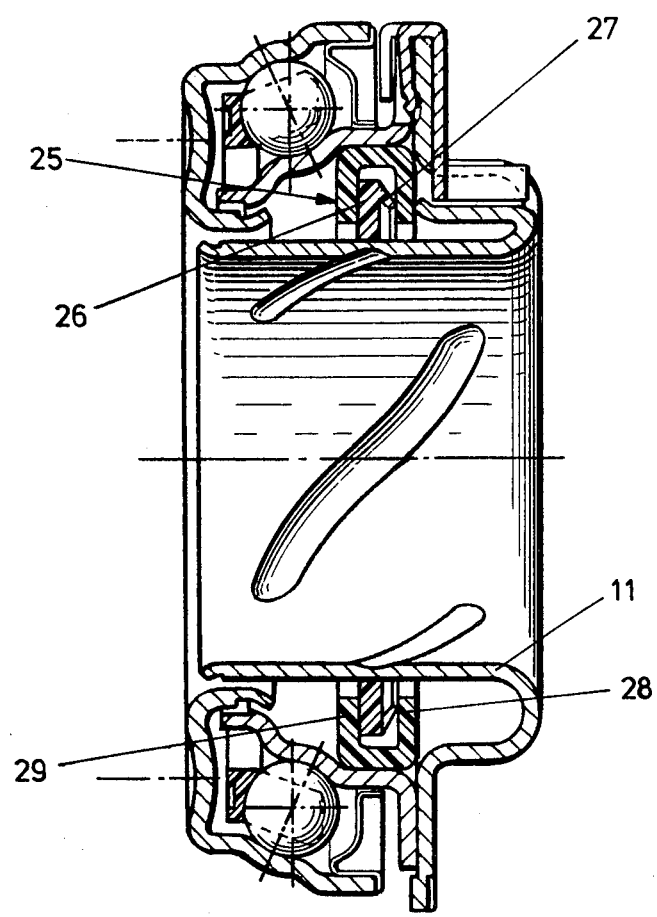

FIG. 3 illustrates a collar and disc arrangement wherein the disc 26 is formed of plastic and is positioned between legs of the U shaped collar 25. This disc is provided with conically shaped axially projecting resilient tongues 27 which contact one leg 28 of the collar 25 and force the plastic disc 26 against the other leg 29.

Figure 4:
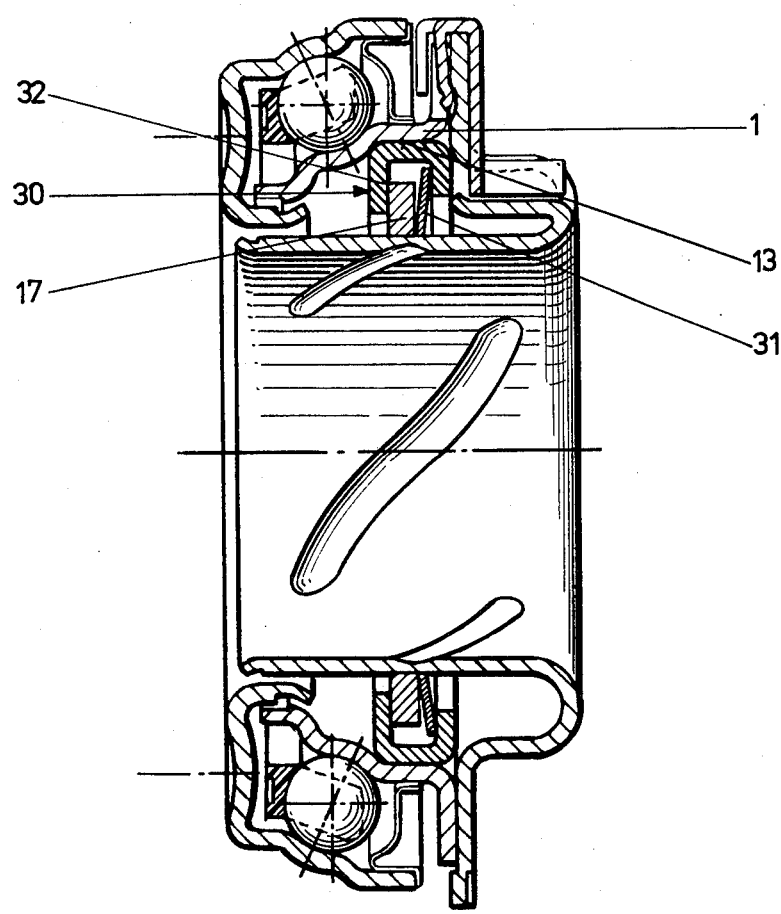

There is illustrated in FIG. 4 a collar 30 which has a generally U shaped cross sectional configuration wherein the disc 17 is forced by a cup spring 31 against one leg 32 of the collar 30.

Figure 5:
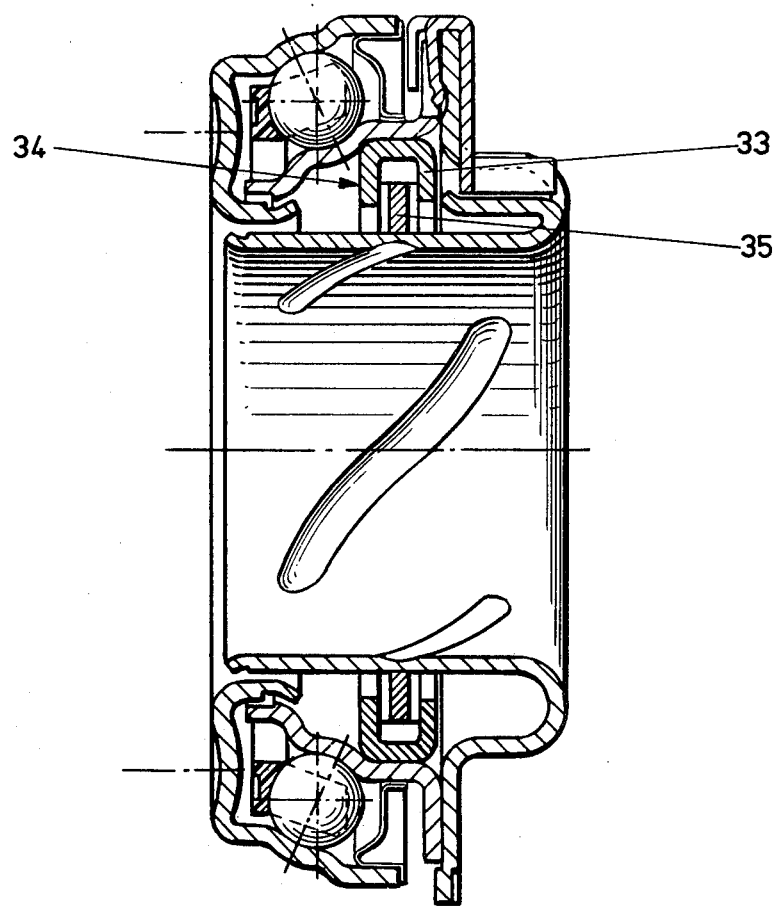

The clutch thrust bearing illustrated in FIG. 5 includes a collar 34 with a generally U shaped cross section. The disc 35 is corrugated and is positioned within the collar to establish a fixed pretension. The collar leg 33 is then flanged over to secure the collar disc assembly.

Figure 6:
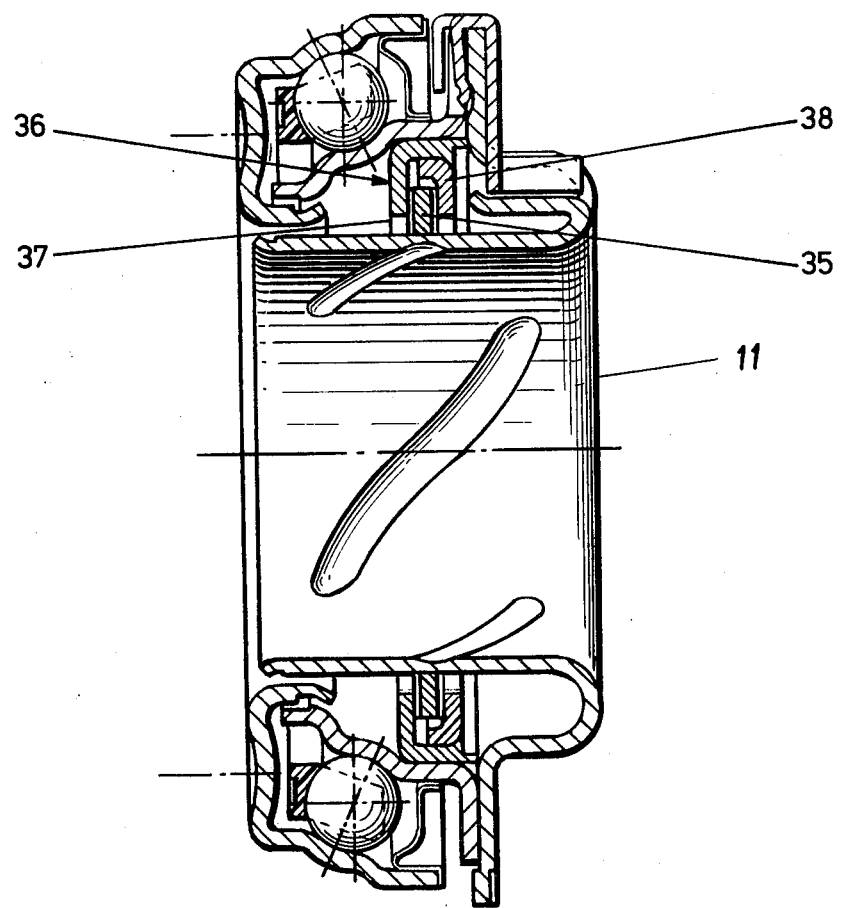

In FIG. 6, the collar 36 is a composite collar comprising members 37 and 38 which are each generally L shaped in cross section and are dimensioned for providing that the segment 38 may be positioned within the segment 37 and its peripheral surface in contact and engages the inner surface of the segment 37. A corrugated disc 35 is positioned between these segments. With this construction, the force with which the corrugated disc 35 is clamped between the radially extending legs of the composite collar 36 can be adjusted to satisfy particular requirements.

Figure 7:
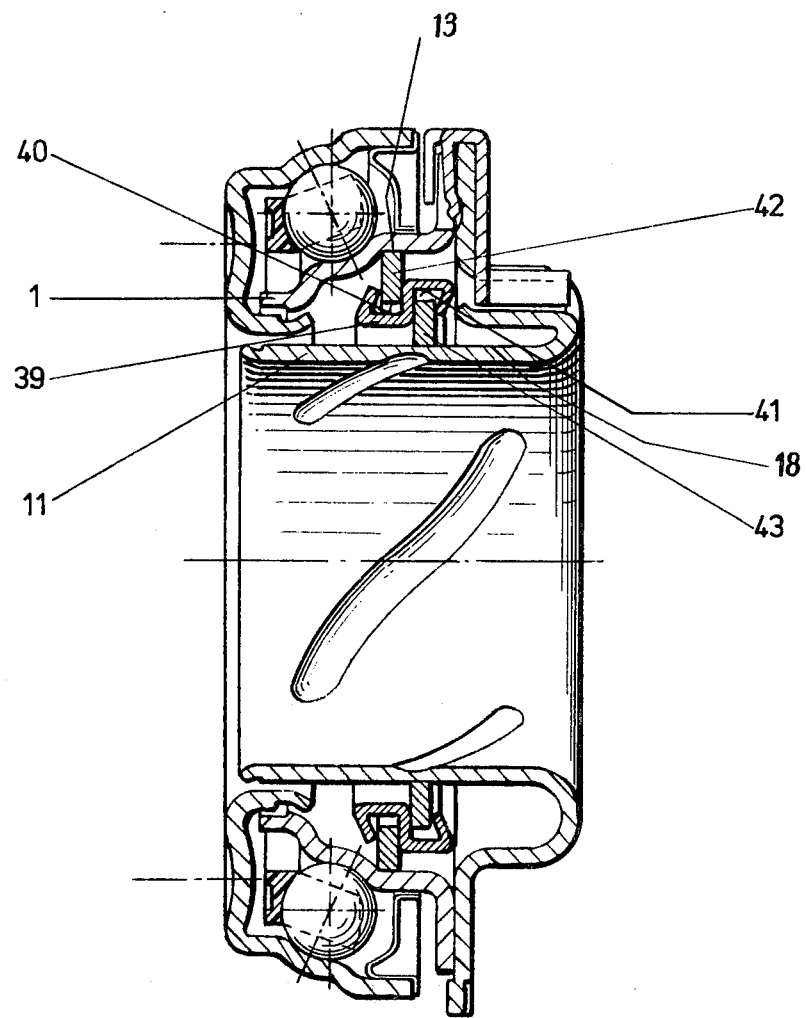
FIG. 7 is a cross sectional view of a self-centering clutch thrust bearing arrangement constructed in accordance with the invention and illustrating an S shaped collar and multiple disc arrangement.

There is illustrated in FIG. 7 a collar 39 having a generally S shaped cross sectional configuration in which the S is horizontally oriented. Two discs 42 and 43 are press fitted in the bore 13 and about the casing or sleeve 18 respectively. These discs are aligned with the spring shaped recesses 40 and 41 respectively in the collar 39 and are dimensioned to provide for clearance in a radial direction. A relatively large radial displacement of the bearing assembly is provided by this construction.

While in the descriptions of FIGS. 2 through 8, only the construction and arrangement of the collars have been considered, it is understood that the mode of operation of these bearings correspond with that described with respect to FIG. 1.

In addition to those forms of construction specifically described hereinbefore, other variations may be provided. For example, the leg 16 of collar 14 of FIG. 1 may be formed by a plurality of resilient tongues as an alternative to the annular leg illustrated. In addition, both legs may be constructed to provide gripping forces on the disc 17. In an alternative embodiment, a U shaped collar 14 may be positioned on the outer ring 4 of the bearing assembly wherein the legs extend in a radially outward direction from the ring. Disc 17 is then press fitted or secured by other means in a shallow boring of a housing, not illustrated. The disc 17 would then extend between the legs 15 and 16 of the collar 14. Furthermore, while in FIGS. 1 through 6 the disc has been described and illustrated as being supported on the sleeve 11 and the collar seated in the bore 13, it may be alternately located with the collar supported on the sleeve 11 and the disc 17 positioned in the bore 13.

While various embodiments of the invention have been described herein, it will be apparent to those skilled in the art that variations may be made thereto without departing from the spirit of the invention and the scope of the appended claims.

What is claimed is:

1. In a self-centering clutch thrust bearing having a sleeve with a radially extending first flange, a rolling bearing assembly having first and second ring-shaped members, and a plurality of rolling elements between said first and second members, said first ring-shaped member having a second radially extending flange adjacent said first flange, means restraining substantial axial and circumferential movement between said first and second flanges while enabling limited radial movement therebetween; the improvement comprising means for releasably maintaining the relative radial positions between said first ring-shaped member and said sleeve, said maintaining means comprising annular disc means, and an annular member having a radially extending recess, said annular disc means extending radially into said recess, said annular member comprising means exerting an axial force on said annular disc means.

2. The thrust bearing of claim 1, wherein said maintaining means extends radially at least partially between said sleeve and said rolling bearing assembly.

3. The thrust bearing of claim 1, wherein said annular member comprises an annular collar, said collar and disc means being dimensioned to enable limited radial movement of said disc means.

4. The thrust bearing of claim 3, wherein said collar has a generally U-shaped cross-section.

5. The thrust bearing of claim 1, wherein said sleeve extends radially inwardly and spaced from said bearing, said annular member comprising a collar radially surrounding said sleeve, and said annular disc means is fixedly held with respect to one of said sleeve and first ring-shaped members.

6. The thrust bearing of claim 5, wherein said ring is fixedly held with respect to said sleeve.

7. The thrust bearing of claim 6, wherein said collar is fixedly held with respect to said first ring-shaped member.

8. The thrust bearing of claim 3, wherein said collar has first and second integrally formed leg segments, said first leg segment being shaped to establish a resilient force against said disc and comprising said means exerting an axial force.

9. The thrust bearing of claim 3, wherein said collar has divided radii.

10. The thrust bearing of claim 9, wherein said collar is divided along a diameter thereof into semicircular segments.

11. The thrust bearing of claim 1, wherein said sleeve comprises a sliding sleeve, said first ring-shaped member is a non-rotating ring member, said annular disc means surrounds and is affixed to said sleeve, and said annular member has a generally U-shaped cross-section and is held with respect to said first ring-shaped member.

12. The thrust bearing of claim 3, wherein the sides of said collar are resiliently biased toward said annular disc means.

13. The thrust bearing of claim 3, wherein said collar has a leg segment thereof extending both in a radial and axial direction, said means exerting an axial force comprising a split ring positioned between the surface of said disc means and said extending leg segment.

14. The thrust bearing of claim 13, wherein said collar includes a second recess formed therein, and further comprising means for engaging said second recess to inhibit circumferential rotation of said collar.

15. The thrust bearing of claim 3, wherein said disc means comprises a resiliently formed segment for establishing said axial force between said disc means and said collar.

16. The thrust bearing of claim 15, wherein said disc means is comprised of a polymer and said resilient segment comprises a tongue integrally formed in the wall of said disc means.

17. The thrust bearing of claim 3, wherein said means exerting an axial force comprises a cup spring.

18. The thrust bearing of claim 3, wherein said disc means has a corrugated cross-section for establishing said axial force.

19. The thrust bearing of claim 3, wherein said collar comprises a first annular shaped body of generally L-shaped cross-section and a second annular shaped body of generally L-shaped cross-section, said second L-shaped body being nestled in and press fit within the periphery of said first annular shaped body.

20. The thrust bearing of claim 3, wherein said collar has a generally S-shaped crosss-section including a pair of recesses formed by a centrally extending first leg segment and second and third leg segments which extend in opposite directions to provide first and second recesses, said disc means comprising a first disc on said sleeve and aligned axially with said first recess and a second disc on one of said ring-shaped members and aligned axially with said second groove.

* * * * *